Figure 1:
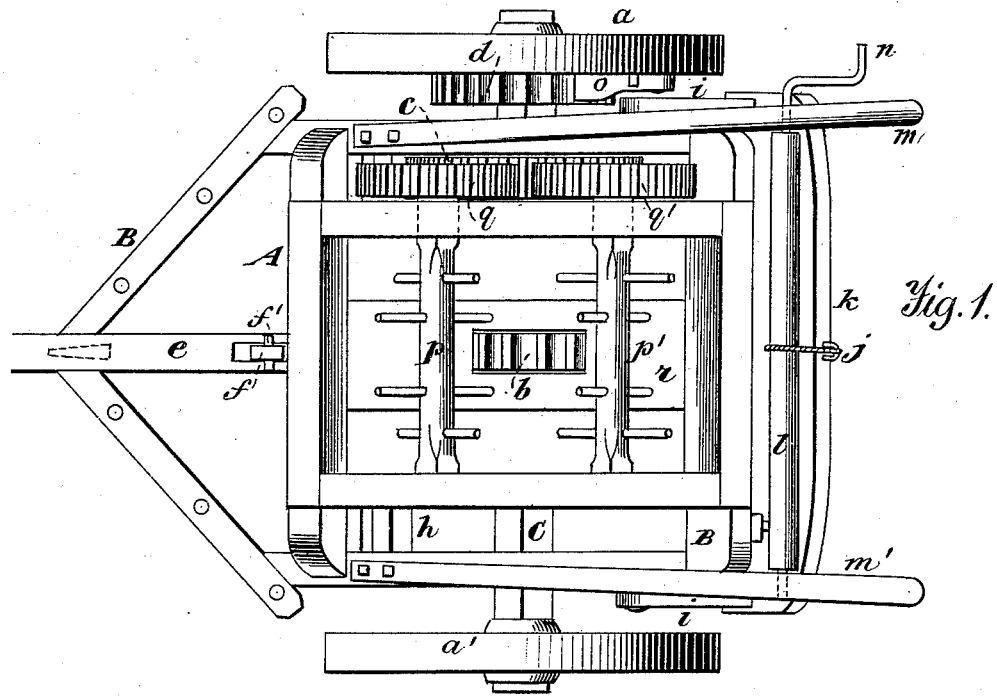

(No Model.)

A. GLISSON.
FERTILIZER DISTRIBUTER.

No. 278,126. Patented May 22, 1883.

Witnesses.
A. Ruppert.
H. J. England.

Inventor.
Abram Glisson
By Ayers & Co.
Attorneys.

UNITED STATES PATENT OFFICE.

ABRAM GLISSON, OF RUTHERFORD, TENNESSEE.

FERTILIZER-DISTRIBUTER.

SPECIFICATION forming part of Letters Patent No. 278,126, dated May 22, 1883.

Application filed December 7, 1882. (No model.)

*To all whom it may concern:*

Be it known that I, A. GLISSON, a citizen of the United States of America, residing at Rutherford, in the county of Gibson and State of Tennessee, have invented certain new and useful Improvements in Fertilizer-Distributers, of which the following is a specification, reference being had therein to the accompanying drawings.

My invention relates to improvements in fertilizer and manure distributers, and to special mechanism designed for opening the furrows, dropping and distributing the seeds, and covering the same.

The objects of my improvement are to evenly distribute the seed and cover the same, and to evenly distribute the fertilizer, manure, &c., and cover the same. I attain these objects by means of the following construction and arrangement of the different parts of my device, which will be more fully described, and pointed out in the specification and claims, and likewise in the drawings forming part of this specification.

Figure 2:
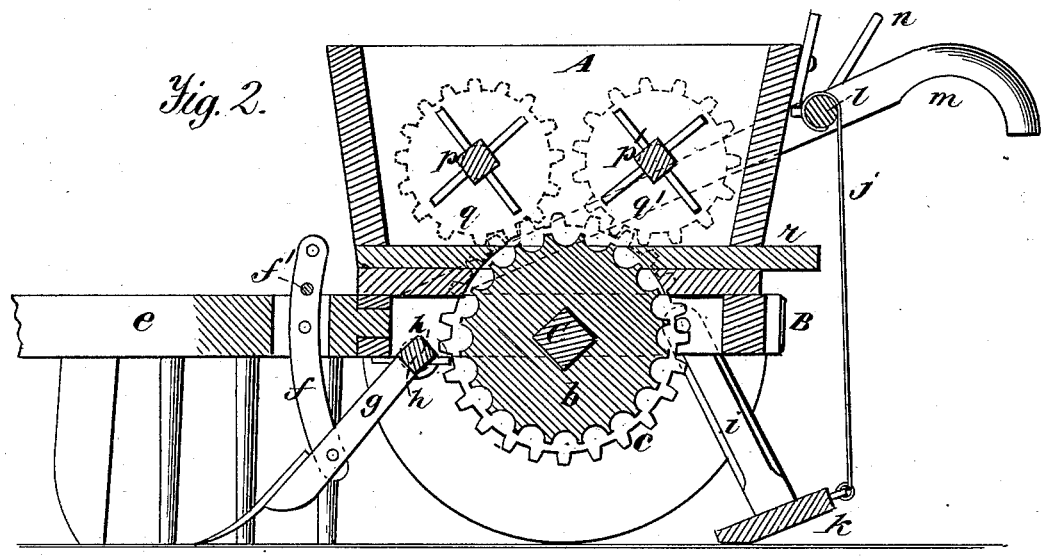
Figure 3:
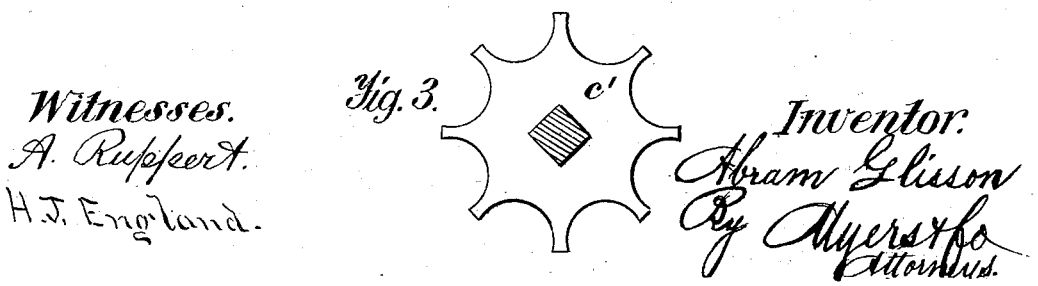

Figure 1 is a top plan view of my improved distributer. Fig. 2 is a longitudinal sectional view of the same; and Fig. 3 is a detail view, showing feed-wheel.

Similar letters refer to similar parts throughout the several views.

A suitable box, A, is mounted on a frame, B, resting loosely on axle C, which is supported on wheels $a\ a'$.

On the center of the axle C is secured a feed-wheel, $b$, the periphery of said wheel being grooved or fluted across its face for the purpose of carrying and distributing seed and fertilizer from box A. Between wheel $b$ and the inner side of the frame B is secured on axle C a cog-wheel, $c$. Between the outer side of the frame B and the carrying or drive wheel $a$ is secured a ratchet-wheel, $d$, on the axle C. Frame B is formed with a triangular frame projection extending in front of the same. At the extreme outer end is secured a colter or furrow-opener, and on either side, extending rearward, are secured teeth for opening drills for the reception of seed, manure, and fertilizers.

From the front edge of frame B, extending through the center of the triangular projection, is secured a draft-beam, $e$. A mortise or slot is formed in said beam vertically, and near the front end of frame B, for the reception of a curved rod, $f$, said rod having perforations in its outer end for the reception of an adjusting-pin, $f'$, its opposite end pivoted to a shovel or plow standard, $g$. The inner end of said standard $g$ is secured to a cross-bar, $h$, that is loosely held in place by journal-bearings attached to each cross side sill of frame B near its front end.

To the rear of the frame B, by means of pivot-pins and arms $i\ i$, is adjustably secured a pulverizer and coverer, $k$. To the center of coverer $k$ is secured the end of string $j$, the opposite end of which is secured to the center of roller $l$. The outer ends of roller $l$ are pivoted in handles $m\ m'$. There is secured to one end of said roller a crank-handle, $n$, by which said roller is turned to wind up the string $j$, which raises the coverer $k$.

On the inside of wheel $a$ is pivoted a pawl, $o$, that is formed to engage with ratchet-wheel $d$, by which shaft or axle C is rotated.

On the inside of box A are loosely journaled, through perforations in the side of said box, two rollers or shafts, $p\ p'$. Both of said shafts are formed with projecting pins extending outward from the shafts in opposite directions. The use and function of these shafts or rollers is to thoroughly mix the seed and fertilizer or manure before they are deposited in the soil. Said shafts extend outside the box near wheel $b$, their outer ends mounted with gear-wheels $q\ q'$, the cogs of which intermesh with each other, and both gear-wheels $q\ q'$ mesh into and gear with wheel $c$.

The bottom of box A is perforated longitudinally, and a slide, $r$, is formed with a similar perforation, through both of which the distributing-wheel $b$ passes and carries the seed and fertilizer to the soil. Wheel $b$ is removably attached to axle C, and, in place of the same, wheel $c'$ is secured when desired to use a wheel of larger cogs for distributing a greater amount of seed or fertilizer over a given space.

Power is attached to the outer end of beam $e$, by which the mixing and distributing machine is operated.

The mode of operation is as follows: Fertilizer or seed is placed in box A. Pawl o is made to engage with wheel d, by which motion is conveyed to the feed-wheel mixing and distributing rollers. While the machine is passing over the ground-drills are opened by teeth and shovels, the seed and fertilizer deposited in said drills, which are then covered by the coverer and clod-crusher, leaving the surface comparatively smooth.

Having described my invention, what I desire to secure by Letters Patent is—

The combination of the shafts $p$ and $p'$, formed with projecting pins and intermeshing gear-wheels $q\ q'$, fluted wheel $b$, and wheel C, substantially as shown, and for the purpose described.

In testimony whereof I affix my signature in presence of two witnesses.

ABRAM GLISSON.

Witnesses:
JOHN WESLEY HOWELL,
WILLIS F. WITHERINGTON.